(12) United States Patent
Sano

(10) Patent No.: US 7,085,269 B2
(45) Date of Patent: Aug. 1, 2006

(54) PACKET SWITCH AND MULTICASTING CONTROL SYSTEM USED FOR THE SAME

(75) Inventor: Kiyoshi Sano, Tokyo (JP)

(73) Assignee: NEC Corporation, Tokyo (JP)

( * ) Notice: Subject to any disclaimer, the term of this patent is extended or adjusted under 35 U.S.C. 154(b) by 896 days.

(21) Appl. No.: 09/968,776

(22) Filed: Oct. 3, 2001

(65) Prior Publication Data

US 2002/0039366 A1    Apr. 4, 2002

(30) Foreign Application Priority Data

Oct. 4, 2000    (JP)    ............................ 2000-304297

(51) Int. Cl.
*H04L 12/28*    (2006.01)
(52) U.S. Cl. ...................... 370/390; 370/412; 370/413; 370/432
(58) Field of Classification Search ................ 370/229, 370/230, 230.1, 235, 389, 390, 412, 413, 370/418, 429, 432
See application file for complete search history.

(56) References Cited

U.S. PATENT DOCUMENTS

| | | | | |
|---|---|---|---|---|
| 5,577,035 A | * | 11/1996 | Hayter et al. | ............. 370/395.4 |
| 5,689,506 A | * | 11/1997 | Chiussi et al. | .............. 370/388 |
| 6,011,779 A | * | 1/2000 | Wills | ........................... 370/236 |
| 6,049,546 A | * | 4/2000 | Ramakrishnan | ............. 370/412 |
| 6,052,376 A | * | 4/2000 | Wills | ........................... 370/419 |
| 6,101,190 A | * | 8/2000 | Song | ........................... 370/411 |
| 6,324,165 B1 | * | 11/2001 | Fan et al. | .................... 370/232 |
| 6,477,169 B1 | * | 11/2002 | Angle et al. | ........... 370/395.42 |
| 6,629,147 B1 | * | 9/2003 | Grow | ........................... 709/236 |
| 6,636,510 B1 | * | 10/2003 | Lee et al. | .................... 370/390 |
| 6,678,279 B1 | * | 1/2004 | Meredith et al. | ........... 370/413 |
| 6,775,286 B1 | * | 8/2004 | Goeury | ........................ 370/392 |
| 6,963,576 B1 | * | 11/2005 | Lee | ............................... 370/411 |

FOREIGN PATENT DOCUMENTS

| | | |
|---|---|---|
| JP | H06-097958 | 4/1994 |
| JP | H07-107095 | 4/1995 |
| JP | H07-177179 | 7/1995 |
| JP | 2000-013405 | 1/2000 |
| JP | 2000-031983 | 1/2000 |
| JP | 2002-533995 | 10/2002 |

* cited by examiner

*Primary Examiner*—Ricky Q. Ngo
*Assistant Examiner*—Andrew C. Lee
(74) *Attorney, Agent, or Firm*—Sughrue Mion, PLLC

(57) ABSTRACT

Address filters 3-0 to 3-m take only those of unicast packets which are addressed to output ports corresponding to them, and an address filter 4 for multicasting takes only multicast packets. When multicast packet output buffers 5-0 to 5-m receive output permissions from output arbitrators 6-0 to 6-m, they send out packets in the accumulation order thereof to corresponding OR gates 9-0 to 9-m for being outputted to output ports. A multicast packet output buffer 7 outputs packets to the output ports when they obtain output permissions from the output arbitrators 6-0 to 6-m corresponding to the output ports, which output data for multicasting from a bit map table 8 are to be outputted from.

8 Claims, 7 Drawing Sheets

FIG.5

MULTICAST PACKET OUTPUT DATA
103-0~103-m

|  | 0 | 1 | 2 | ... | m |
|---|---|---|---|---|---|
| 0 | 0 | 0 | 0 | | |
| 1 | 0 | 1 | 1 | | |
| 2 | | | | | |

MULTICAST PACKET CONNECTION NUMBER

PACKET SWITCH AND MULTICASTING CONTROL SYSTEM USED FOR THE SAME

BACKGROUND OF THE INVENTION

This application claims benefit of Japanese Patent Application No. 2000-304297 filed on Oct. 4, 2000, the contents of which are incorporated by the reference.

The present invention relates to packet switching and multicasting control systems used for the same and, more particularly, to multicasting control systems used in the case where multicast and unicast packets are switched together.

In a multicasting control system of this type, as shown in FIG. 7, a bit map table 35 stored with multicast output port data indicative of output ports which multicast packets are to be outputted from are stored, is accessed from a packet multiplexer 32.

Referring to FIG. 7, packets are sent out from input ports 301-0 to 301-n to input buffers 31-0 to 31-n. The input buffers 31-0 to 31-1 refers to multicast display bits and output port number bits stored in headers of the packets and tentatively accumulates them in their input buffers (not shown) for unicasting and those (not shown) for multicasting.

Subsequently, output requests are sent to output arbitrators (not shown) in the input buffers 31-0 to 31-n, and when the output arbitrators permit the output, the accumulated packets are sent to a packet multiplexer 32.

The packet multiplexer 32 multiplexes all the packets from the input buffers 31-0 to 31-n in predetermined fixed time slots, and then refers to the multicast display bits stored in the headers of the packets. When a multicast packet is identified, the bit map table 35 is retrieved on the basis of multicast packet connection number.

Multicast output port data obtained by the retrieval of the bit map table 35, are notified via a signal bus 303 to corresponding address filters 33-0 to 33-m, and the multicast packets are sent out to the time division basis multiplexed packet bus 302. When the inputted packets are unicast packets, the packet multiplexer 32 directly sends out the multiplexed packets to a time division basis multiplexed packet bus 302.

The packets sent out from the packet multiplexer 32 to the time division basis multiplexing path 302 are distributed to all the address filters 33-0 to 33-m. The address filters 33-0 to 33-m refer to the multicast display bits and output port number bits stored in the headers of the inputted packets.

When the inputted packets are unicast packets, the address filters 33-0 to 33-m take only packets, in each of which the output port number is identical with the own port address, and send the taken packets to output buffers 34-0 to 34-m.

When the inputted packets are multicast packets, the address filters 33-0 to 33-m each take only packets addressed to the pertinent output ports as detected from the multicast output port data received from the bit map table 35, and send out the taken packets to the output buffers 34-0 to 34-m.

The output buffers 34-0 to 34-m tentatively accumulate the received packets, and progressively send out these packets to output ports 305-0 to 305-m. When the number of the accumulated packets reach a threshold number, upon which a back pressure signal is to be sent out, the output buffers 34-0 to 34-m send out back pressure signals (i.e., congestion evasion signals) 304-0 to 304-m for evading the to the input buffers 31-0 to 31-n and stopping the sending of packets addressed to the output buffers 34-0 to 34-m.

In the above prior art multicast control system, when a back pressure signal is outputted from, for instance, the output buffer 34-0 in FIG. 7, it is sent to the corresponding one of the input buffers 31-0 to 31-n, which accumulates packets addressed to the output buffer 34-0, thus stopping the sending of packets addressed to the output ports 35-0.

Besides, since among the inputted multicast packets may be those addressed to the output buffer 34-0, the back pressure signal is also sent to the input buffers for multicasting in the input buffers 31-0 to 31-0, thus stopping the sending of the packets.

However, since the multicast packets may not be those addressed to the output buffer 34-0, it is possible to stop the sending of packets addressed to the output buffers, which have sent no back pressure signal.

SUMMARY OF THE INVENTION

An object of the present invention is to provide a packet switch capable of realizing higher viscosity back pressure, and a multicasting control system used for the same.

According to an aspect of the present invention, there is provided a packet switch comprising a plurality of input buffer units each for tentatively storing unicast packets to be switched from a single input port to a single output port and multicast packets to be switched form a single input port to a plurality of output ports, the packet switch thus switching together the unicast and multicast packets, wherein: the packet switch further comprises a plurality of unicast packet output buffers for tentatively accumulating unicast packets to be outputted to the output ports, and a multicast packet output buffer provided separately from the unicast packet output buffers for tentatively storing the multicast packets to be outputted to the output ports; and congestion evasion signals for unicasting and congestion evasion signals for multicasting are independently sent out to the input buffer units.

The packet switch further comprises a bit map table for storing multicast packet output port data indicative of output ports, which multicast packets are to be outputted from, the bit map table being provided at a stage subsequent to a packet multiplexer for multiplexing together unicast and multicast packets. The input buffer units each include a plurality of unicast packet input buffers for tentatively storing unicast packets and a multicast packet input buffer for tentatively storing the multicast packets; and pluralities of buffers are provided as the unicast packet input buffers, the multicast packet input buffer, the unicast packet output buffers and the multicast packet output buffer in correspondence to different kinds of packets. Pluralities of buffers are provided as the unicast packet input buffers and the multicast packet input buffer in the input buffer units, the unicast packet output buffers and the multicast packet output buffer in two groups, one being for image sequences (motion image), which importance of real time property is attached to, and the other being for data, which no substantial importance of real time property is attached to. Pluralities of threshold values for the generation of the congestion evasion signals are provided in the unicast packet output buffers and the multicast packet output buffer.

According to another aspect of the present invention, there is provided a multicasting control system for a packet switch comprising a plurality of input buffer units each for tentatively storing unicast packets to be switched from a single input port to a single output port and multicast packets to be switched form a single input port to a plurality of output ports, the packet switch thus switching the unicast packets and the multicast packets, wherein congestion evasion signals for unicasting and congestion evasion signals for multi-casting are sent out independently from a plurality of unicast packet output buffers for tentatively storing the unicast packets to be outputted to the output ports and a multicast packet output buffer provided separartely from the unicast packet output buffers for tentatively accumulating multicast packets to be outputted to the output ports to the input buffer units.

The multicasting control system further comprises a bit map table for storing multicast packet output port data indicative of output ports, from which multicast packets are to be outputted, the bit map table being provided at a stage subsequent to a packet multiplexer for multiplexing the unicast packets and the multicast packets. The input buffer units each include pluralities of buffers provided as a plurality of unicast packet input buffers for tentatively storing the unicast packets, and a multicast packet input buffer for for tentatively accumulating multicast packets, and pluralities of packets are provided as the unicast packet input buffers, the multicast packet input buffer, the unicast packet output buffers and the multicast packet output buffer in correspondence to different kinds of packets. Pluralities of buffers are provided as the unicast packet input buffers, the multicast packet input buffer, the unicast packet output buffers and the multicast packet output buffer in two groups, one being for image sequences (motion image), which importance of real time property is attached to, and the other being for data, which no substantial importance of real time property is attached to. Pluralities of threshold values of congestion evasion signal generation are provided in the unicast packet output buffers and the multicast packet output buffer.

In summary, in the multicasting control system according to the present invention, the packet switch comprises a multicast packet output buffer, which is provided separately from unicast packet output buffers, and congestion evasion signal for multicasting is sent out separately from congestion evasion signal for unicasting to the input buffer units. Thus, unicast packets in the input buffer units can be send out to the subsequent stages without being adversely affected by the congestion of the multicast packets.

Other objects and features will be clarified from the following description with reference to attached drawings.

BRIEF DESCRIPTION OF THE DRAWINGS

FIG. 5 is a view showing the structure of the bit map table 8 in FIG. 1;

PREFERRED EMBODIMENTS OF THE INVENTION

Preferred embodiments of the present invention will now be described with reference to the drawings.

Figure 1:
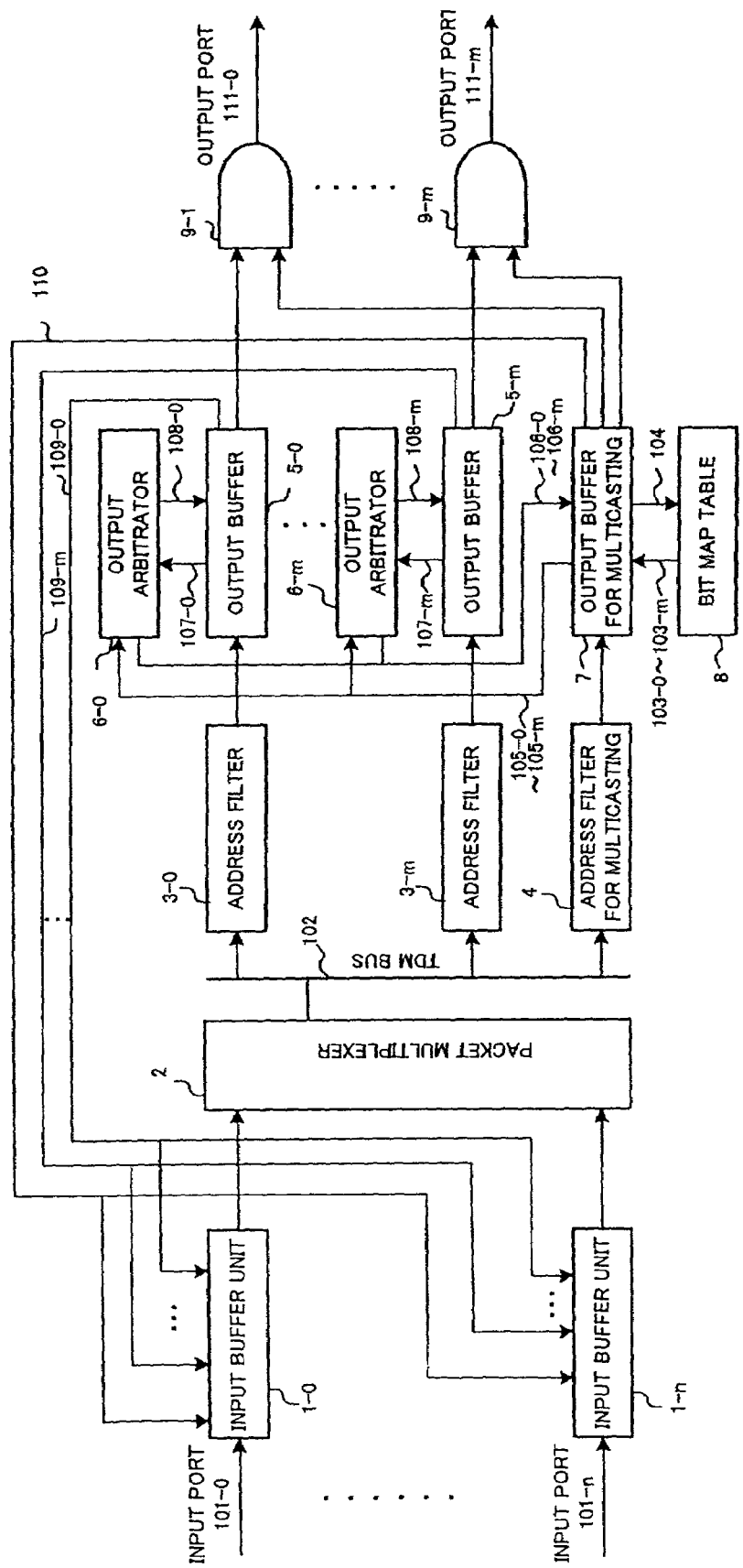
FIG. 1 is a block diagram showing the construction of a packet switch in one embodiment of the present invention.

FIG. 1 is a block diagram showing the construction of a packet switch in one embodiment of the present invention. Referring to FIG. 1, the embodiment of the packet switch comprises an input buffer unit including input buffer units 1-0 to 1-n, a packet multiplexer 2, address filters 3-0 to 3-n for unicasting, an address filter 4 for multicasting, unicast packet output buffers 5-0 to 5-m, output arbitrators 6-0 to 6-m, a multicast packet output buffer 7, a bit map table 8 and OR gates 9-0 to 9-m.

Figure 2:
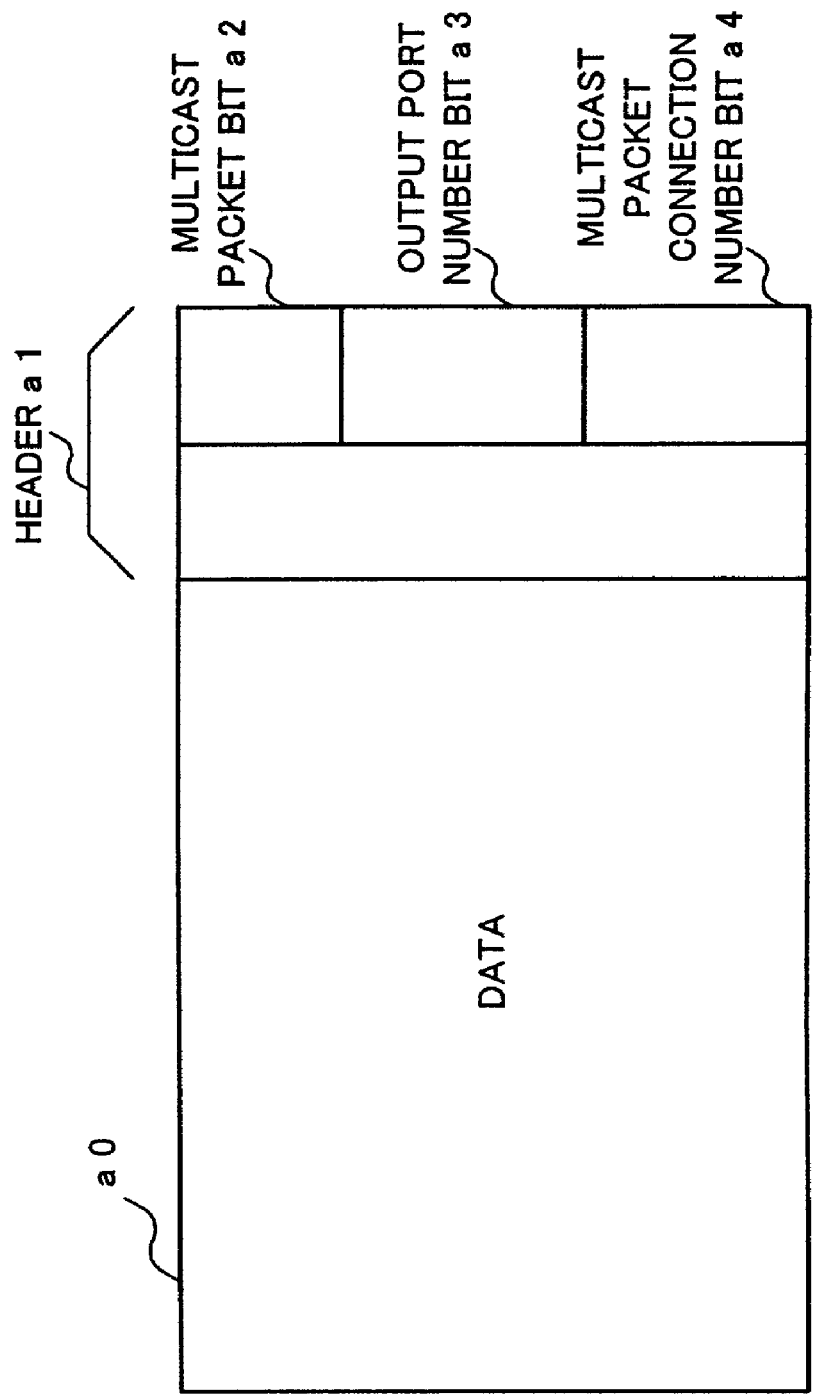
FIG. 2 is a view showing the packet form used in one embodiment of the present invention.

FIG. 2 is a view showing the packet form used in one embodiment of the present invention. Referring to FIG. 2, the illustrated packet comprises a data part a0 and a header part a1. The header part al has a multicast display bit a2, an output port number bit a3 and a multicast packet connection number bit a4.

Figure 3:
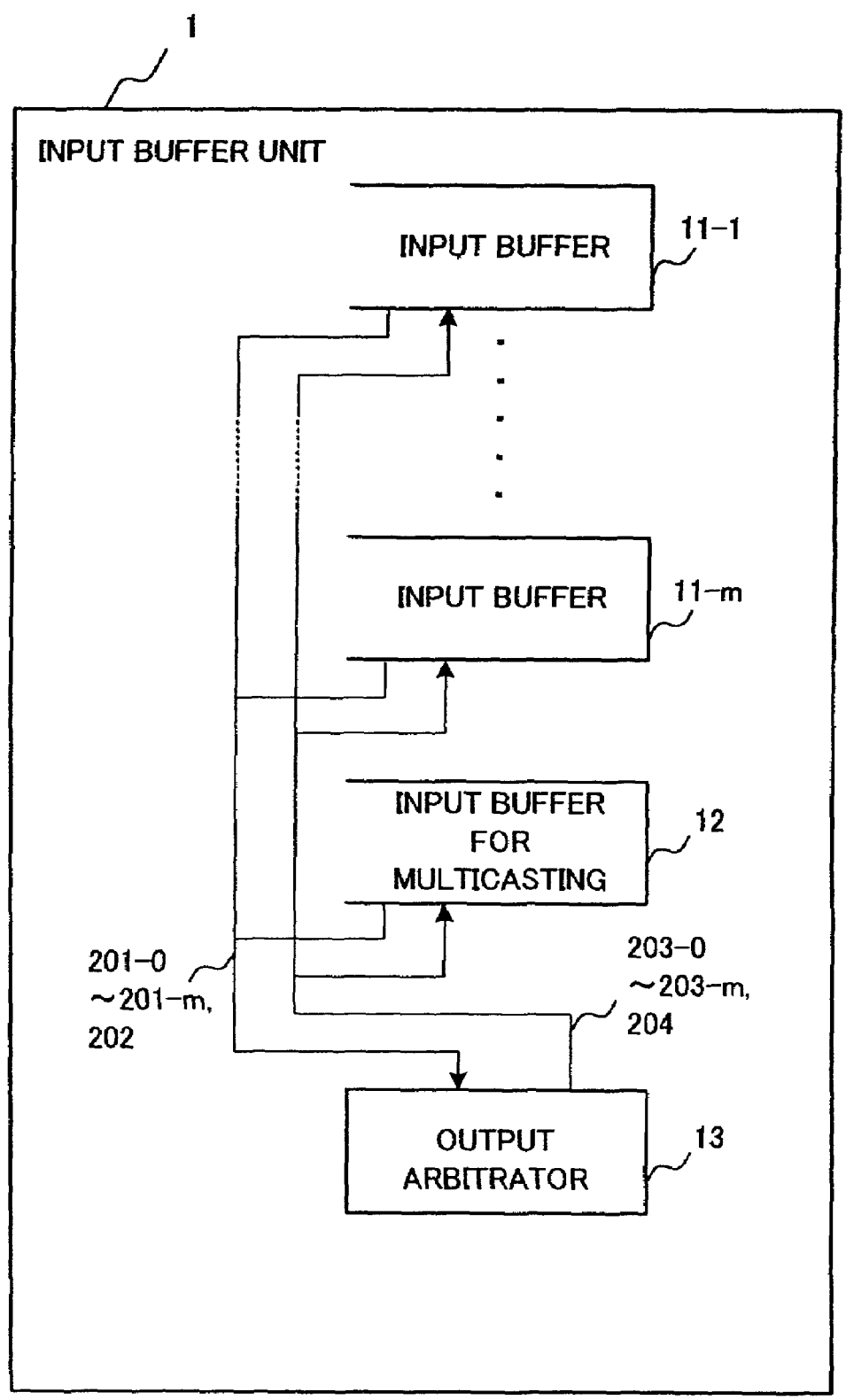
FIG. 3 is a block diagram showing the input buffer unit 1 in FIG. 1.

FIG. 3 is a block diagram showing the input buffer unit 1 in FIG. 1. Referring to FIG. 3, the input buffer unit 1 includes unicast packet input buffers 11-0 to 11-m, a multicast packet input buffer 12 and an output arbitrator 13.

Figure 4:
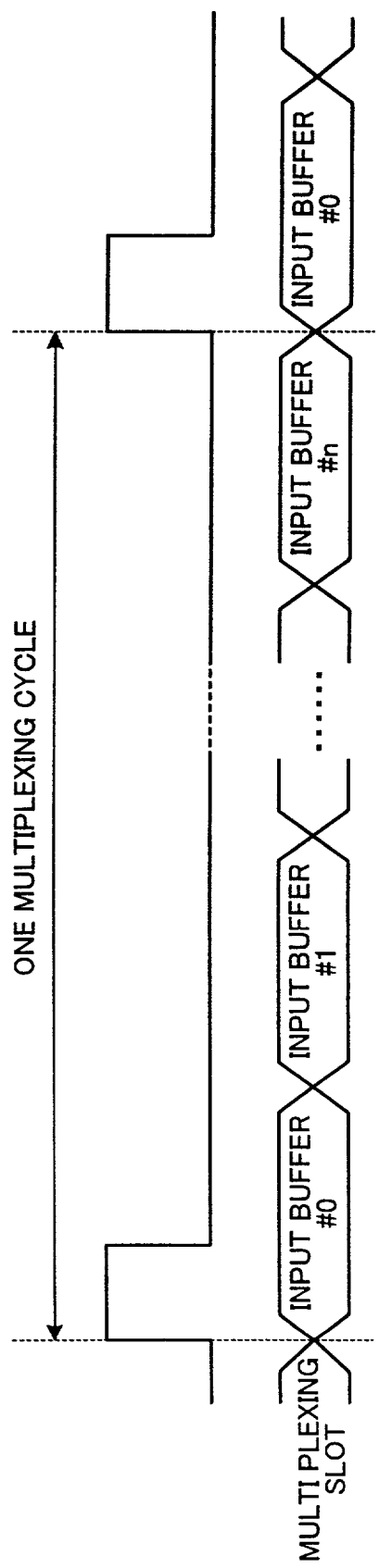
FIG. 4 is a view showing an example of the packet multiplexing structure used in the embodiment of the present invention.

FIG. 4 is a view showing an example of the packet multiplexing structure used in the embodiment of the present invention. Referring to FIG. 4, in a multiplexing slot of the packet multiplexing, the packets in input buffers #0, #1, . . . , #n are progressively multiplexed in one multiplexing cycle.

FIG. 5 is a view showing the structure of the bit map table 8 in FIG. 1. Referring to FIG. 5, the bit map style data (or multicast packet output data), which permit identification of an output port from a multicast packet connection number, are accumulated in the bit map table 8, and data "1" is written in the bit of an output port, from which a packet is to be outputted.

Figure 6:
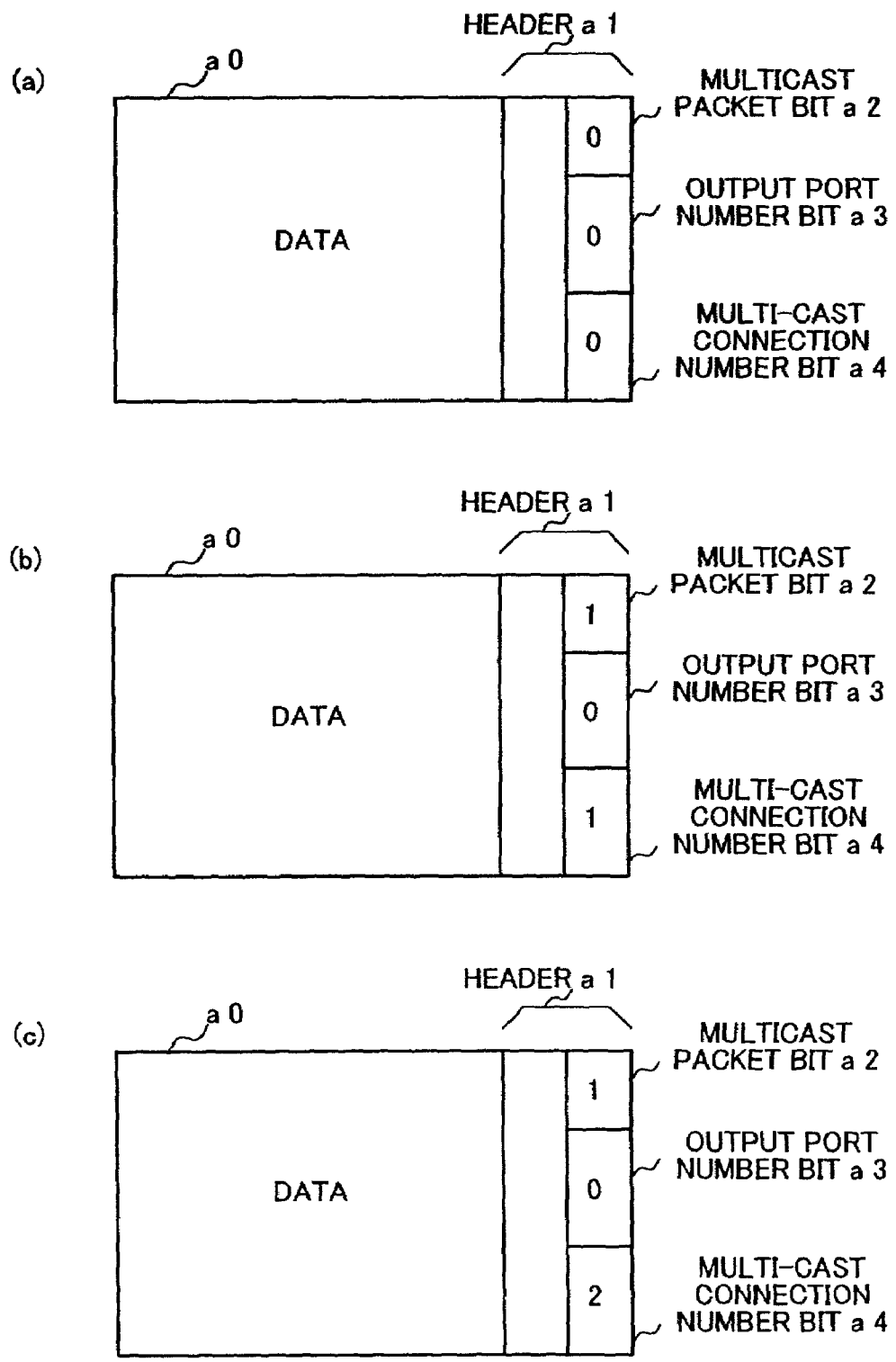
FIGS. 6(a) to 6(c) are views showing packets inputted from the input ports 101-0 to 101-n in FIG. 1.
Figure 7:
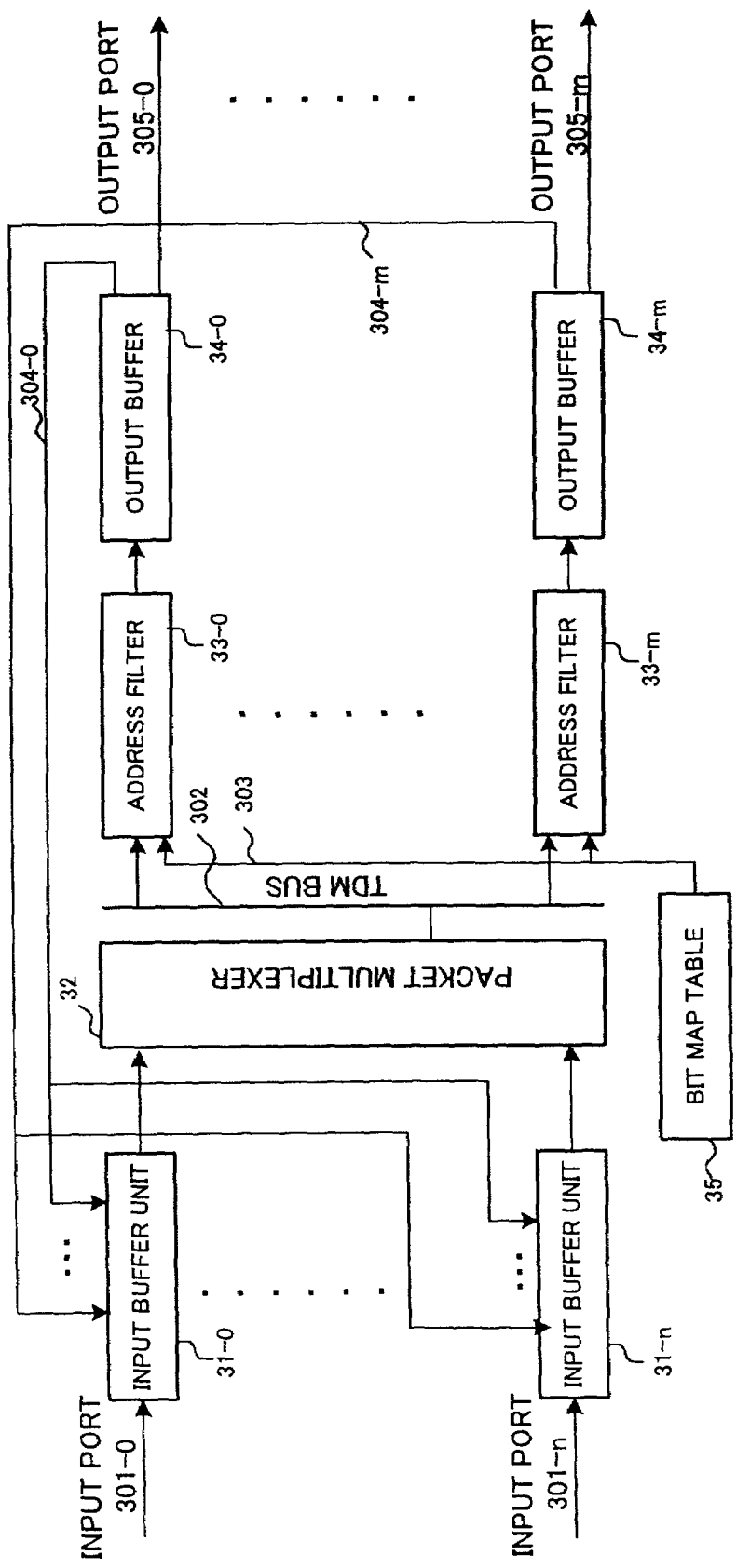
FIG. 7 is a prior art block diagram of the packet switch.

FIGS. 6(a) to 6(c) are views showing packets inputted from the input ports 101-0 to 101-n in FIG. 1. The construction of the packet switch in the embodiment of the present invention will now be described with reference to FIGS. 1 to 6.

Packets are inputted to the input ports 101-0 to 101-n from a stage (not shown) preceding the embodiment of the packet switch. As shown in FIG. 2, the inputted packets each have data part a0 indicative of user data and header part al indicative of control data in the switch.

To the header part a1 is assigned a multicast display bit a2 for the discrimination of a unicast packet, which is subject to switching from a single input port to a single output port, or a multicast packet, which is subject to switching from a single input port to a plurality of output ports. This bit indicates a unicast packet when it is "0", and indicates a multicast packet when it is "1".

The header part a1 also has output port number bit a3 indicative of an output port number and a multi-cast connection number bit a4 indicative of a connection number at the multicasting time.

The input buffer units 1-0 to 1-n are provided for the input ports 101-0 to 101-n, respectively. As shown in FIG. 3, the input buffer units 1-0 to 1-n each include unicast packet input buffers 11-0 to 11-m for receiving unicast packets each for each output port, a multicast packet input buffer 12 for receiving multicast packets, and an output arbitrator 13.

When each of the input buffer units 1-0 to 1-n receives a packet, it refers to the multicast display bit a2 in the header part a1. When the received packet is a unicast packet, each input buffer unit refers to the output port number bit a3 of that packet, and accumulates the packet in one of the unicast packet input buffers 11-0 to 11-m corresponding to the pertinent output port. When the received packet is a multicast packet, the input buffer unit accumulates the packet in the multicast packet input buffer 12.

Subsequently, the unicast packet input buffers 11-0 to 11-m and the multicast packet input buffer 12 send out output requests to the output arbitrator 13, and the input buffers which has received the output permission signals 203-0 to 203-m and 204 send out the packets.

The packet multiplexer 2 has a function of multiplexing the packets from all the input buffer units 1-0 to 1-m in predetermined time slots. FIG. 4 shows the manner of the packet multiplexing in the packet multiplexer 2.

The packet multiplexer 2 sends out the packets, after the multiplexing thereof on a time division basis, for distribution via a time division basis multiplexed (TDM) packet bus 102 to address filters 3-0 to 3-m for unicasting and address filter 4 for multicasting.

The address filters 3-0 to 3-m are provided for the output ports and the output buffers, respectively. When receiving an input packet, the address filters 3-0 to 3-m each refer to the multicast display bit a2 stored in the header part a1 of the packet. When the bit is "0" indicative of a unicast packet, the address filters 3-0 to 3-m take only the packets addressed to their own output ports, and send out these packets to the unicast packet output buffers 5-0 to 5-m, respectively.

The address filter 4 for multicasting takes only input packets, which each have data "1" set in the multicast display bit a2 stored in their header part a1, i.e., only multicast packets, and send out these pockets to the multicast packet output buffer 7.

The unicast packet output buffers 5-0 to 5-m progressively accumulate the received packets, and send out output requests 107-0 to 107-m to the output arbitrators 6-0 to 6-m, respectively. When the unicast packet input buffers 5-0 to 5-m receive output permissions 108-0 to 108-m from the output arbitrators 6-0 to 6-m, they send out packets in the accumulation order thereof to the OR gates 9-0 to 9-m for being outputted to the output ports 111-0 to 111-m.

The multicast packet output buffer 7 progressively accumulates received packets, and obtain multicast packet output data 103-0 to 103-m of the oldest accumulated packets in accumulation order thereof by referring to the bit map table 8 via the signal bus 104 on the basis of the multicast packet connection number bit a4 stored in the header part a1 of each packet.

According to the multicast packet output data 103-1 to 103-m thus obtained, the multicast packet output buffer 7 then sends out output requests 105-0 to 105-m to the output arbitrators 6-0 to 6-m of the unicast packet output buffers 5-0 to 5-m corresponding to the output ports, from which packets are to be outputted. When the multicast packet output buffer 7 receives output permissions 106-0 to 106-m from the output arbitrators 6-0 to 6-m, it sends the packets in the accumulation order thereof to the output parts, which have obtained the output permissions.

In the unicast packet output buffers 5-0 to 5-m and the multicast packet output buffer 7, the number of packets capable of being accumulated is determined by the memory capacity and the like. When packets in excess of the accumulation permissible number enters the unicast packet output buffers 5-0 to 5-m and the multicast packet output buffer 7, they are lost.

To prevent this from occurring, a certain threshold value less than the accumulation permissible number is set, and when the threshold number is reached by the packet number, the unicast packet output buffers 5-0 to 5-m and the multicast packet output buffer 7 send out, to the input buffers 1-0 to 1-n, notifications for stopping the sending of packets addressed to them. These notifications are the back pressure signals 109-0 to 109-m and 110 of the congestion evasion signals.

As shown in FIG. 5, in the bit map table 8 bit map style data (multicast packet output port data) are stored such that an output port can be identified from the multicast packet connection number. Specifically, data "1" is written in the bit indicative of an output port, from which a packet is to be outputted.

The output arbitrators 6-0 to 6-m monitor the output requests 107-0 to 107-m and 105-0 to 105-m from the unicast packet output buffers 5-0 to 5-m and the multicast packet output buffer 7 in every output arbitration cycle, and arbitrates the output permissions to the unicast packet output buffers 5-0 to 5-m and the multicast packet output buffer 7.

Now, the operation of the embodiment of the packet switch according to the present invention will be described with reference to FIGS. 1 to 6. For the sake of the brevity of the description, the number n of input ports and the number m of output ports in FIG. 1 are set to 3, the structure of packets inputted from the input ports is as shown in FIGS. 6(*a*) to 6(*c*), the structure of the bit map table 8 is as shown in FIG. 5, and the threshold number of packets, upon reaching of which the unicast packet input buffers 5-0 and 5-m and the multicast packet input buffer 7 generate the back pressure signals 109-0 to 109-m and 110, is set to 2.

Referring to FIG. 1, the packets as shown in FIGS. 6(*a*) to 6(*c*) are inputted from the input ports 101-1 to 101-2. The input buffer unit 1-0 refers to the header part a1 of the received packet as shown in FIG. 6(*a*). Since the data in the multicast display bit a2 and the output port number bit a3 are both "0", the packet is accumulated in the input buffer 11-0 in the input buffer unit 1 shown in FIG. 3. Then, an output request 201-0 is sent out to the output arbitrator 13. When the output permission 203-0 is received, the input buffer unit 1-0 sends out the packet to the packet multiplexer 2.

The input buffer units 1-1 and 1-2, like the input buffer unit 1-0, accumulate packet in their multicast packet input buffers 12 by referring to the header parts a1 of the packets shown in FIGS. 6(*b*) and 6(*c*). Then, in each unit the output request 202 is sent out to the output arbitrator 13. When each unit receives the output permission 204, it sends out packet to the packet multiplexer 2.

As shown in FIG. 4, the packet multiplexer 2, in which a time slot is allotted for each of the input buffer units 1-0 to 1-n, multiplexes packets in corresponding time slots, and sends out the multiplexed packets to the time division basis multiplexed packet bus 102.

The packets sent to the time division basis multiplexed packet bus 102 are distributed to all of the address filters 3-0 to 3-m for unicasting and the address filter 4 for multicasting. The address filter 3-0 for unicasting refers to the multicast display bit a2 stored in the header a1 of the received packet and takes only packets with the bit "0", that is, unicast cell and addressed to the output port "0" corresponding to it on the basis of the output port number bit a3, in other word, only packets from the input buffer unit 1-0 (such as the packet shown in FIG. 6(*a*)).

Likewise, the address filter 4 for multicasting takes packets from the input buffer units 1-1 and 1-2 (such as the packets shown in FIGS. 6(*b*) and 6(*c*)). The address filters 3-1 and 3-2 for unicasting take no packet because no packet to be taken is present.

After packet accumulation, the unicast packet output buffer 5-0 sends out the output request 107-0 to the output arbitrator 6-0 simultaneously with the start of the next output arbitration. Simultaneously with the start of the next output arbitration, the multicast packet output buffer 7, in which the packets (i.e., packets shown in FIGS. 6(b) and 6(c)) from the input buffer units 1-1 and 1-2 are progressively accumulated, refers to the bit map table 8 on the basis of the multicast packet connection number bit a4 stored in the header part a1 of the packet (i.e., packet shown in FIG. 6(b)) from the input buffer unit 1-1. From the multicast packet output port data 103-0 to 103-2 thus obtained, the output buffer 5-0 then notifies multicast packet output requests 105-1 and 105-2 to the output arbitrators 6-1 and 6-2 belonging to the output ports #1 and #2, for which bit data "1" is set.

Then, simultaneously with the start of the next output arbitration the multicast packet output buffer 7 processes packet (i.e., packet shown in FIG. 6(c)) from the input buffer unit 1-2, and notifies multicast packet output requests 105-1 and 105-2 to the output arbitrators 6-1 and 6-2.

The output arbitrators 6-0 to 6-2 do output arbitration in response to the received output requests, and notifies an output permission 108-0 and multicast packet output permissions 106-1 and 106-2. The unicast packet output buffers 5-0 to 5-2 send out packets via the OR gates 9-0 to 9-2 to the output ports 111-0 to 111-2.

As described before, for preventing the flooding of packets, the unicast packet output buffers 5-0 to 5-3 and the multicast packet output buffer 7 have a function of restricting packets addressed to them by sending out the back pressure signals 109-0 to 109-3 and 110 to the input buffer units 1-0 to 1-3.

The multicast packet output buffer 7 is presently in the state of packet number 2 which is the threshold number for sending out the back pressure signal, and thus it can send out the back pressure signal 110 to the multicast packet input buffers 12 in the input buffer units 1-0 to 1-2 to stop the sending of packets to it.

It will be seen that it is possible to dispose the multicast packet output buffer 7 by disposing the bit map table 8 with the multicast packet output data 103-0 to 103-m stored therein at a stage subsequent to the packet multiplexer 2. This means that the back pressure can be separately notified to the input buffer units 1-0 to 1-n both as the back pressure signals 109-0 to 109-m for unicasting and as the back pressure signal 110 for multicasting. It is thus possible to realize higher viscosity back pressure.

In addition, by providing pluralities of buffers as the unicast packet input buffers 11-0 and 11-n and the multicast packet input buffer 12 in the input buffer units 1, the unicast packet output buffers 5-0 to 5-m and the multicast packet output buffer 7 in two groups, one being for image sequences (motion image), which importance of real time property is attached to, the other being for data, which no substantial importance of real time property is attached to, it is possible to realize still higher level congestion evasion.

Furthermore, by providing pluralities of threshold values for the generation of the back pressure signals (or congestion evasion signals) 109-0 to 109-m and 110 in the unicast packet output buffers 5-0 to 5-m and the multicast packet output buffer 7, it is possible to realize still higher level congestion evasion.

More specifically, by the provision of the multicast packet output buffer 7 separately from the unicast packet output buffers 5-0 to 5-m, the back pressure signal 110 for multicasting connection can be sent out separately from the back pressure signals 109-0 to 109-m, thus permitting the unicast packets in the input buffer units 1-0 to 1-m to be sent out to the succeeding stage without being adversely affected by the congestion of the multicast packets.

As has been described in the foregoing, the packet switch according to the present invention, which comprises a plurality of input buffer units for tentatively accumulating unicast packets for switching from a single input port to a single output port and multicast packets for switching from a single input port to a plurality of output ports and switches together the unicast and multicast packets, can realize improved viscosity back pressure by permitting the congestion evasion signals for unicasting and the congestion evasion signals for multicasting to be sent out independently from one another from the unicast packet output buffers, which tentatively accumulate unicast packets to be outputted to the output ports, and the multicast packet output buffer, which is provided separately from the unicast packet output buffers and serves to tentatively accumulate multicast packets to be outputted to the output ports, to the input buffer units.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A packet switch comprising a plurality of input buffer units each for tentatively storing unicast packets to be switched from a single input port to a single output port and multicast packets to be switched from a single input port to a plurality of output ports, the packet switch thus switching together the unicast and multicast packets, wherein:
   the packet switch further comprises a plurality of unicast packet output buffers for tentatively accumulating unicast packets to be outputted to the output ports, and a multicast packet output buffer provided separately from the unicast packet output buffers for tentatively storing the multicast packets to be outputted to the output ports;
   congestion evasion signals for unicasting and congestion evasion signals for multicasting are independently sent out to the input buffer units; and
   a bit map table for storing multicast packet output port data indicative of output ports, which multicast packets are to be outputted from, the bit map table being provided at a stage subsequent to a packet multiplexer for multiplexing together unicast and multicast packets.

2. A packet switch comprising a plurality of input buffer units each for tentatively storing unicast packets to be switched from a single input port to a single output port and multicast packets to be switched from a single input port to a plurality of output ports, the packet switch thus switching together the unicast and multicast packets, wherein:
   the packet switch further comprises a plurality of unicast packet output buffers for tentatively accumulating unicast packets to be outputted to the output ports, and a multicast packet output buffer provided separately from the unicast packet output buffers for tentatively storing the multicast packets to be outputted to the output ports;
   congestion evasion signals for unicasting and congestion evasion signals for multicasting are independently sent out to the input buffer units;
   the input buffer units each include a plurality of unicast packet input buffers for tentatively storing unicast packets and a multicast packet input buffer provided separately from the unicast packet input buffers for tentatively storing the multicast packets; and pluralities of buffers are provided as the unicast packet input buffers, the multicast packet input buffer, the unicast packet output buffers and the multicast packet output buffer in correspondence to different kinds of packets.

3. The packet switch according to claim 2, wherein pluralities of buffers are provided as the unicast packet input buffers and the multicast packet input buffer in the input buffer units, the unicast packet output buffers and the multicast packet output buffer in two groups, one being for image sequences (motion image), which importance of real time property is attached to, and the other being for data, which no substantial importance of real time property is attached to.

4. The packet switch according to claim 1 or 2, wherein pluralities of threshold values for the generation of the congestion evasion signals are provided in the unicast packet output buffers and the multicast packet output buffer.

5. A multicasting control system for a packet switch comprising a plurality of input buffer units each for tentatively storing unicast packets to be switched from a single input port to a single output port and multicast packets to be switched from a single input port to a plurality of output ports, the packet switch thus switching the unicast packets and the multicast packets, and a bit map table for storing multicast packet output port data indicative of output ports, from which multicast packets are to be outputted, the bit map table being provided at a stage subsequent to a packet multiplexer for multiplexing the unicast packets and the multicast packets, wherein congestion evasion signals for unicasting and congestion evasion signals for multi-casting are sent out independently from a plurality of unicast packet output buffers for tentatively storing the unicast packets to be outputted to the output ports and a multicast packet output buffer provided separately from the unicast packet output buffers for tentatively accumulating multicast packets to be outputted to the output ports to the input buffer units.

6. A multicasting control system for a packet switch comprising a plurality of input buffer units each for tentatively storing unicast packets to be switched from a single input port to a single output port and multicast packets to be switched from a single input port to a plurality of output ports, the packet switch thus switching the unicast packets and the multicast packets, wherein congestion evasion signals for unicasting and congestion evasion signals for multicasting are sent out independently from a plurality of unicast packet output buffers for tentatively storing the unicast packets to be outputted to the output ports and a multicast packet output buffer provided separately from the unicast packet output buffers for tentatively accumulating multicast packets to be outputted to the output ports to the input buffer units and the input buffer units each include pluralities of buffers provided as a plurality of unicast packet input buffers for tentatively storing the unicast packets, and a multicast packet input buffer provided separately from the unicast packet input buffers for tentatively accumulating multicast packets, and pluralities of packets are provided as the unicast packet input buffers, the multicast packet input buffer, the unicast packet output buffers and the multicast packet output buffer in correspondence to different kinds of packets.

7. The multicasting control system according to claim 6, wherein pluralities of buffers are provided as the unicast packet input buffers, the multicast packet input buffer, the unicast packet output buffers and the multicast packet output buffer in two groups, one being for image sequences (motion image), which importance of real time property is attached to, and the other being for data, which no substantial importance of real time property is attached to.

8. The multicasting control system according to claim 5 or 6, wherein pluralities of threshold values of congestion evasion signal generation are provided in the unicast packet output buffers and the multicast packet output buffer.

* * * * *